(12) United States Patent
Spinks et al.

(10) Patent No.: US 11,305,941 B2
(45) Date of Patent: Apr. 19, 2022

(54) TRANSPORTATION APPARATUS AND METHOD

(71) Applicant: HS PRODUCTS LIMITED, Leeds (GB)

(72) Inventors: Simon Spinks, Leeds (GB); David Clare, Leeds (GB)

(73) Assignee: HS PRODUCTS LIMITED, Leeds (GB)

( * ) Notice: Subject to any disclaimer, the term of this patent is extended or adjusted under 35 U.S.C. 154(b) by 0 days.

(21) Appl. No.: 16/616,081

(22) PCT Filed: May 30, 2018

(86) PCT No.: PCT/GB2018/051465
§ 371 (c)(1),
(2) Date: Nov. 22, 2019

(87) PCT Pub. No.: WO2018/220362
PCT Pub. Date: Dec. 6, 2018

(65) Prior Publication Data
US 2020/0140199 A1    May 7, 2020

(30) Foreign Application Priority Data
May 31, 2017 (GB) .................................. 1708639

(51) Int. Cl.
*B65G 17/46* (2006.01)
*B65G 15/42* (2006.01)
(Continued)

(52) U.S. Cl.
CPC ............. *B65G 17/46* (2013.01); *B65G 15/42* (2013.01); *B65G 15/58* (2013.01); *B65G 47/82* (2013.01); *B68G 9/00* (2013.01)

(58) Field of Classification Search
CPC ........ B65G 17/46; B65G 17/12; B65G 15/58; B65G 47/82; B68G 9/00
(Continued)

(56) References Cited

U.S. PATENT DOCUMENTS

| 274,715 A | 3/1883 | Buckley |
| 380,651 A | 4/1888 | Fowler et al. |

(Continued)

FOREIGN PATENT DOCUMENTS

| CA | 2225304 A1 | 6/1998 |
| CN | 2903019 Y | 5/2007 |

(Continued)

OTHER PUBLICATIONS

Final Office Action issued by the U.S. Patent and Trademark Office dated Jun. 17, 2020 in related U.S. Appl. No. 14/420,690, 41 pages.
(Continued)

*Primary Examiner* — Gene O Crawford
*Assistant Examiner* — Lester Rushin, III
(74) *Attorney, Agent, or Firm* — Gesmer Updegrove LLP

(57) ABSTRACT

A conveyor (400) for transporting articles, such as coils springs, is described. The conveyor comprises a substrate (420) for supporting articles during transportation, and a plurality of retaining members (520) located on the substrate for retaining the articles during transportation. The retaining members (520) each comprise a mounting portion (530) for mounting to the substrate (420). A containment portion (540) comprises proximal and distal parts (540*a*) and (540*b*) define a space therebetween for receiving a coil spring (100) under compression. Slots (550*a*) and (550*b*) in the containment parts are aligned for receiving pushers.

10 Claims, 5 Drawing Sheets

(51) Int. Cl.
*B65G 15/58* (2006.01)
*B65G 47/82* (2006.01)
*B68G 9/00* (2006.01)

(58) Field of Classification Search
USPC .......................... 198/803.8, 457.01
See application file for complete search history.

(56) References Cited

U.S. PATENT DOCUMENTS

| | | | |
|---|---|---|---|
| 653,155 A | 7/1900 | Tilden | |
| 1,480,796 A | 1/1924 | Van Orman | |
| 1,531,547 A | 3/1925 | Edelson et al. | |
| 1,561,468 A | 11/1925 | Jordan et al. | |
| 1,852,943 A | 4/1932 | Swanson | |
| 1,896,670 A | 2/1933 | Garst | |
| 1,915,264 A | 6/1933 | Schneider et al. | |
| 1,963,053 A | 6/1934 | Powers | |
| 1,963,054 A | 6/1934 | Powers | |
| 2,114,008 A | 4/1938 | Wunderlich | |
| 2,250,042 A | 7/1941 | Sundt et al. | |
| 2,276,002 A | 3/1942 | Torok | |
| 2,388,106 A | 10/1945 | Woller | |
| 2,461,062 A | 2/1949 | Kane | |
| 2,716,308 A | 8/1955 | Hodges, Jr. | |
| 3,073,565 A | 1/1963 | Daumy | |
| 3,319,447 A | 5/1967 | Wise | |
| 3,355,747 A | 12/1967 | Ross | |
| 3,462,779 A | 8/1969 | Thompson | |
| 3,990,587 A * | 11/1976 | Redman | B21C 47/24 |
| | | | 414/567 |
| 4,018,956 A | 4/1977 | Casey | |
| 4,077,619 A | 3/1978 | Borlinghaus | |
| 4,109,443 A | 8/1978 | Findlay | |
| 4,111,407 A | 9/1978 | Stager | |
| 4,160,544 A | 7/1979 | Higgins | |
| 4,365,767 A | 12/1982 | Benthimere | |
| 4,397,453 A | 8/1983 | Seecamp | |
| 4,439,977 A | 4/1984 | Stumpf | |
| 4,485,506 A | 12/1984 | Stumpf et al. | |
| 4,529,848 A | 7/1985 | Cherry | |
| 4,549,323 A | 10/1985 | Brockhaus | |
| 4,711,067 A | 12/1987 | Magni et al. | |
| 4,733,036 A | 3/1988 | Koizumi et al. | |
| 4,809,375 A | 3/1989 | Bull | |
| 4,881,393 A | 11/1989 | Sykes | |
| 4,961,982 A | 10/1990 | Taylor | |
| 4,986,634 A | 1/1991 | Horikawa et al. | |
| 5,023,970 A | 6/1991 | Tesch | |
| 5,040,255 A | 8/1991 | Barber, Jr. | |
| 5,127,635 A | 7/1992 | Long et al. | |
| 5,311,624 A | 5/1994 | Hutchinson | |
| 5,425,531 A | 6/1995 | Perrault | |
| 5,438,718 A | 8/1995 | Kelly et al. | |
| 5,467,489 A | 11/1995 | Cchen | |
| 5,488,746 A | 2/1996 | Hudson | |
| 5,501,317 A | 3/1996 | Sommer et al. | |
| 5,503,375 A | 4/1996 | Balsells | |
| 5,586,511 A | 12/1996 | Porter et al. | |
| 5,669,093 A | 9/1997 | Ogle et al. | |
| 5,791,638 A | 8/1998 | Balsells | |
| 5,878,998 A | 3/1999 | Hsieh | |
| 5,885,407 A | 3/1999 | Mossbeck | |
| 5,957,438 A | 9/1999 | Workman et al. | |
| 5,966,759 A | 10/1999 | Sanders et al. | |
| 5,987,668 A | 11/1999 | Ackley | |
| 6,036,181 A | 3/2000 | Workman | |
| 6,049,959 A | 4/2000 | Grondahl | |
| 6,085,397 A | 7/2000 | Workman et al. | |
| 6,131,892 A | 10/2000 | Stumpf | |
| 6,159,319 A | 12/2000 | Mossbeck | |
| 6,173,464 B1 | 1/2001 | McCune et al. | |
| 6,175,997 B1 | 1/2001 | Mossbeck | |
| 6,176,961 B1 | 1/2001 | Mossbeck et al. | |
| 6,220,586 B1 | 4/2001 | Palvin et al. | |
| 6,256,820 B1 | 7/2001 | Moser et al. | |
| 6,260,223 B1 | 7/2001 | Mossbeck et al. | |
| 6,260,331 B1 | 7/2001 | Stumpf | |
| 6,341,767 B1 | 1/2002 | Seale et al. | |
| 6,397,418 B1 | 6/2002 | Stjerna | |
| 6,398,199 B1 | 6/2002 | Barber | |
| 6,408,514 B1 * | 6/2002 | Mossbeck | B21F 33/04 |
| | | | 140/3 CA |
| 6,574,811 B1 | 6/2003 | Mossbeck | |
| 6,631,529 B1 | 10/2003 | Erickson | |
| 6,684,435 B1 | 2/2004 | Wells | |
| 6,684,608 B2 | 2/2004 | Gibbons | |
| 6,688,457 B2 | 2/2004 | Haubert et al. | |
| 6,718,726 B1 | 4/2004 | Kuchel et al. | |
| 6,804,847 B2 | 10/2004 | Grothaus | |
| 6,883,196 B2 | 4/2005 | Barber | |
| 6,922,895 B1 | 8/2005 | Whitworth | |
| 6,931,685 B2 | 8/2005 | Kuchel et al. | |
| 7,100,862 B2 | 9/2006 | Skarzenski et al. | |
| 7,178,187 B2 | 2/2007 | Barman et al. | |
| 7,303,065 B2 * | 12/2007 | Kaufman | B65G 17/12 |
| | | | 198/470.1 |
| 7,644,461 B2 | 1/2010 | Lee | |
| 7,827,637 B2 | 11/2010 | DeFranks | |
| 7,850,153 B2 | 12/2010 | Bock | |
| 7,877,964 B2 | 2/2011 | Spinks et al. | |
| 7,997,397 B2 | 8/2011 | Akiyoshi | |
| 8,011,046 B2 | 9/2011 | Stjerna | |
| 8,087,114 B2 | 1/2012 | Lundevall | |
| 8,167,285 B2 | 5/2012 | Balsells | |
| 8,266,745 B2 | 9/2012 | Mossbeck | |
| 8,307,523 B2 | 11/2012 | Mossbeck et al. | |
| 8,382,653 B2 | 2/2013 | Dubi et al. | |
| 9,670,053 B2 * | 6/2017 | Graf | B21F 35/00 |
| 2002/0124321 A1 | 9/2002 | Wells | |
| 2002/0124531 A1 | 9/2002 | Mossbeck et al. | |
| 2003/0217413 A1 | 11/2003 | Grothaus | |
| 2004/0025256 A1 | 2/2004 | Mossbeck | |
| 2004/0070128 A1 | 4/2004 | Balsells | |
| 2004/0103618 A1 | 6/2004 | De Santis et al. | |
| 2004/0128773 A1 | 7/2004 | Barber | |
| 2004/0172676 A1 | 9/2004 | Franssen et al. | |
| 2004/0206051 A1 | 10/2004 | Gecic et al. | |
| 2005/0007441 A1 | 1/2005 | Hyuga | |
| 2005/0055778 A1 | 3/2005 | Kuchel et al. | |
| 2005/0224626 A1 | 10/2005 | Pfeifer | |
| 2005/0257883 A1 | 11/2005 | Anagnostopoulos | |
| 2006/0075567 A1 | 4/2006 | DeFranks | |
| 2006/0236462 A1 | 10/2006 | Boyd | |
| 2006/0272098 A1 | 12/2006 | Hochschild | |
| 2006/0272928 A1 | 12/2006 | Kritzinger | |
| 2007/0022538 A1 | 2/2007 | Zschoch | |
| 2007/0022540 A1 | 2/2007 | Hochschild | |
| 2007/0101507 A1 | 5/2007 | Grothaus | |
| 2007/0124865 A1 | 6/2007 | Stjerna | |
| 2007/0199155 A1 | 8/2007 | Thygsen | |
| 2007/0216076 A1 | 9/2007 | Ahn | |
| 2007/0235915 A1 | 10/2007 | Ahn | |
| 2007/0256246 A1 | 11/2007 | Gladney et al. | |
| 2008/0054688 A1 | 3/2008 | Longnecker | |
| 2008/0189824 A1 | 8/2008 | Rock et al. | |
| 2008/0246197 A1 | 10/2008 | Mossbeck et al. | |
| 2009/0079113 A1 | 3/2009 | Martin | |
| 2009/0266032 A1 | 10/2009 | Spinks et al. | |
| 2010/0212090 A1 | 8/2010 | Stjerna | |
| 2010/0326012 A1 | 12/2010 | Blunschi | |
| 2011/0209514 A1 | 9/2011 | Huon | |
| 2012/0112396 A1 | 5/2012 | DeFranks et al. | |
| 2012/0260422 A1 | 10/2012 | Rock et al. | |
| 2013/0334747 A1 | 12/2013 | Spinks | |
| 2014/0033440 A1 | 2/2014 | Tyree | |
| 2014/0033441 A1 | 2/2014 | Morgan et al. | |
| 2015/0026893 A1 | 1/2015 | Garrett et al. | |
| 2015/0084251 A1 | 3/2015 | Ahn | |
| 2016/0249744 A1 | 9/2016 | Eigenmann et al. | |
| 2016/0354820 A1 | 12/2016 | Katou | |
| 2017/0008756 A1 | 1/2017 | Clare et al. | |
| 2017/0340130 A1 | 11/2017 | Mossbeck | |

(56) References Cited

U.S. PATENT DOCUMENTS

| | | |
|---|---|---|
| 2017/0354267 A1 | 12/2017 | Alletto, Jr. |
| 2019/0000239 A1 | 1/2019 | Thomas et al. |
| 2019/0290015 A1 | 9/2019 | Fisher |

FOREIGN PATENT DOCUMENTS

| | | | | |
|---|---|---|---|---|
| CN | 101140019 A | 3/2008 | | |
| CN | 201777876 U | 3/2011 | | |
| CN | 201890767 U | 7/2011 | | |
| CN | 202112703 U | 1/2012 | | |
| CN | 203740239 U | 7/2014 | | |
| DE | 899008 C | 12/1953 | | |
| DE | 3143269 A1 | 5/1983 | | |
| DE | 3514042 A1 | 10/1986 | | |
| DE | 4031651 A1 | 4/1992 | | |
| DE | 4031654 A1 | 4/1992 | | |
| DE | 4040220 A1 | 6/1992 | | |
| DE | 4225147 A1 | 9/1993 | | |
| DE | 4419206 C1 | 3/1995 | | |
| DE | 19529911 A1 | 2/1997 | | |
| DE | 10244766 A1 | 5/2003 | | |
| DE | 102008061465 B3 | 8/2009 | | |
| EP | 0089789 A1 | 9/1983 | | |
| EP | 252211 A2 | 1/1988 | | |
| EP | 0359035 A1 | 3/1990 | | |
| EP | 0401318 A1 | 12/1990 | | |
| EP | 0558078 A1 | 9/1993 | | |
| EP | 0899034 A2 | 3/1999 | | |
| EP | 0941962 A1 | 9/1999 | | |
| EP | 0943445 A2 | 9/1999 | | |
| EP | 1993947 A1 | 11/2008 | | |
| EP | 1993947 B1 | 3/2014 | | |
| EP | 2565152 B1 | * 6/2014 | ............... | B68G 9/00 |
| ES | 2270477 T3 | * 4/2007 | ............ | B65H 19/30 |
| FR | 2171782 A5 | 9/1973 | | |
| FR | 2561620 A1 | 9/1985 | | |
| FR | 2606756 A1 | 5/1988 | | |
| FR | 2780624 A1 | 1/2000 | | |
| GB | 947298 A | 1/1964 | | |
| GB | 1461671 A | 1/1977 | | |
| GB | 2056336 A | 3/1981 | | |
| GB | 2437825 A | 11/2007 | | |
| GB | 2477139 A | 7/2011 | | |
| GB | 2488214 A | 8/2012 | | |
| GB | 2537854 A | 11/2016 | | |
| GB | 2576216 A | 2/2020 | | |
| GB | 2523895 B | 12/2020 | | |
| JP | S5157452 U | 5/1976 | | |
| JP | 56090136 A | 7/1981 | | |
| JP | S60165121 U | 11/1985 | | |
| JP | S6134950 U | 3/1986 | | |
| JP | S6155867 U | 4/1986 | | |
| JP | 59212545 A | 10/1989 | | |
| JP | 2001340175 A | 12/2001 | | |
| KR | 101008136 B1 | 6/2005 | | |
| SU | 846007 A1 | 7/1981 | | |
| WO | 9203077 A1 | 3/1992 | | |
| WO | 9530622 A1 | 11/1995 | | |
| WO | 9617701 A1 | 6/1996 | | |
| WO | 9635637 A1 | 11/1996 | | |
| WO | WO-9947830 A2 | * 9/1999 | ............... | B68G 9/00 |
| WO | 9956591 A1 | 11/1999 | | |
| WO | 0126507 A1 | 4/2001 | | |
| WO | 0145875 A1 | 6/2001 | | |
| WO | 03027840 A1 | 4/2003 | | |
| WO | 03035304 A1 | 5/2003 | | |
| WO | 03036874 A2 | 5/2003 | | |
| WO | 2004099004 A1 | 11/2004 | | |
| WO | 2006043862 A1 | 4/2006 | | |
| WO | 2007031774 A1 | 3/2007 | | |
| WO | 2007102772 A1 | 9/2007 | | |
| WO | 2009030017 A1 | 3/2009 | | |
| WO | 2009111801 A2 | 9/2009 | | |
| WO | 2010026477 A2 | 3/2010 | | |
| WO | 2011142549 A2 | 11/2011 | | |
| WO | 2011142549 A3 | 11/2011 | | |
| WO | 2013054104 A1 | 4/2013 | | |
| WO | 2014113737 A1 | 7/2014 | | |
| WO | 2015087557 A1 | 6/2015 | | |
| WO | 2015114361 A1 | 8/2015 | | |
| WO | 2015114363 A1 | 8/2015 | | |
| WO | 2017137754 A1 | 8/2017 | | |
| WO | 2018220366 A1 | 12/2018 | | |
| WO | 2019034849 A2 | 2/2019 | | |
| WO | 2019034850 A1 | 2/2019 | | |

OTHER PUBLICATIONS

Final Office Action issued by the U.S. Patent and Trademark Office in related U.S. Appl. No. 15/115,451 dated Jun. 12, 2020, 14 pages.

International Search Report and Written Opinion issued by the International Searching Authority, the European Patent Office, for International Application No. PCT/GB2018/051469, dated Aug. 23, 2018, 9 pages.

International Preliminary Report on Patentability issued by the International Bureau of WIPO in related International Application No. PCT/GB2018/051469 dated Dec. 3, 2019, 9 pages.

International Search Report and Written Opinion issued by the International Searching Authority, the European Patent Office, for International Application No. PCT/GB2018/051465, dated Mar. 22, 2018, 21 pages.

"Fold," Mirriam-Webster.com, Merriam-Webster, n.d. Wednesday, Jan. 29, 2018, 1 page.

International Preliminary Report on Patentability issued by the International Bureau of WIPO dated Jan. 15, 2013 in related International Application No. PCT/GB2011/052169, 14 pages.

Non-Final Office Action issued by the U.S. Patent and Trademark Office dated Aug. 7, 2015 in related U.S. Appl. No. 13/884,049, 8 pages.

Final Office Action issued by the U.S. Patent and Trademark Office dated Apr. 27, 2016 in related U.S. Appl. No. 13/884,049, 9 pages.

Non-Final Office Action issued by the U.S. Patent and Trademark Office dated Nov. 10, 2016 in related U.S. Appl. No. 13/884,049, 6 pages.

Final Office Action issued by the U.S. Patent and Trademark Office dated May 4, 2017 in related U.S. Appl. No. 13/884,049, 8 pages.

Non-Final Office Action issued by the U.S. Patent and Trademark Office dated Jan. 30, 2018 in related U.S. Appl. No. 13/884,049, 5 pages.

International Preliminary Report on Patentability issued by the International Bureau of WIPO dated Feb. 10, 2015 in related International Application No. PCT/GB2013/052131, 5 pages.

International Search Report and Written Opinion issued by the International Searching Authority dated Nov. 5, 2013 in related International Application No. PCT/GB2013/052131, 7 pages.

International Search Report and Written Opinion issued by the International Searching Authority dated Feb. 12, 2013 in related International Application No. PCT/GB2012/052503, 8 pages.

Non-Final Office Action issued by the U.S. Patent and Trademark Office dated Oct. 2, 2015 in related U.S. Appl. No. 14/420,690, 8 pages.

Final Office Action issued by the U.S. Patent and Trademark Office dated Jun. 24, 2016 in related U.S. Appl. No. 14/420,690, 9 pages.

Non-Final Office Action issued by the U.S. Patent and Trademark Office dated Jun. 27, 2017 in related U.S. Appl. No. 14/420,690, 18 pages.

Final Office Action issued by the U.S. Patent and Trademark Office dated Sep. 20, 2017 in related U.S. Appl. No. 14/420,690, 18 pages.

Non-Final Office Action issued by the U.S. Patent and Trademark Office dated Sep. 25, 2018 in related U.S. Appl. No. 14/420,690, 15 pages.

Final Office Action issued by the U.S. Patent and Trademark Office dated Jun. 4, 2019 in related U.S. Appl. No. 14/420,690, 21 pages.

Non-Final Office Action issued by the U.S. Patent and Trademark Office dated Dec. 20, 2019 in related U.S. Appl. No. 14/420,690, 12 pages.

(56) References Cited

OTHER PUBLICATIONS

International Search Report and Written Opinion issued by the International Searching Authority in related International Application No. PCT/GB2011/052169 dated Jan. 16, 2012, 6 pages.
Search Report issued by British Intellectual Property Office in related British Patent Application No. 1214312.9 dated Nov. 6, 2012, 6 pages.
International Preliminary Report on Patentability issued by the International Bureau of WIPO dated Feb. 10, 2015 in related International Application No. PCT/GB2013/052129, 4 pages.
International Search Report and Written Opinion issued by the International Searching Authority dated Dec. 5, 2013 in related International Application No. PCT/GB2013/052129, 6 pages.
Non-Final Office Action issued by the U.S. Patent and Trademark Office dated Mar. 6, 2017 in related U.S. Appl. No. 14/420,692, 9 pages.
Final Office Action issued by the U.S. Patent and Trademark Office dated Sep. 20, 2017 in related U.S. Appl. No. 14/420,692, 8 pages.
Search Report issued by British Intellectual Property Office in related Brittish Patent Application No. 1214305.3 dated Nov. 28, 2012, 3 pages.
International Preliminary Report on Patentability issued by the International Bureau of WIPO in related International Application No. PCT/GB2013/052130 dated Feb. 10, 2015, 5 pages.
International Search Report and Written Opinion issued by the International Searching Authority in related International Application No. PCT/GB2013/052130 dated Nov. 27, 2013, 7 pages.
Non-Final Office Action issued by the U.S. Patent and Trademark Office in related U.S. Appl. No. 14/420,691 dated Jun. 23, 2015, 4 pages.
Search Report issued by British Intellectual Property Office in related British Patent Application No. 1214314.5 dated Nov. 9, 2012, 4 pages.
International Preliminary Report on Patentability issued by the International Bureau of WIPO in related International Application No. PCT/GB2015/050235 dated Aug. 2, 2016, 11 pages.
International Search Report and Written Opinion issued by the International Searching Authority in related International Application No. PCT/GB2015/050235 dated Sep. 5, 2013, 14 pages.
Non-Final Office Action issued by the U.S. Patent and Trademark Office dated Sep. 11, 2018 in related U.S. Appl. No. 15/115,451, 10 pages.
Final Office Action issued by the U.S. Patent and Trademark Office dated Apr. 11, 2019 in related U.S. Appl. No. 15/115,451, 9 pages.
Non-Final Office Action issued by the U.S. Patent and Trademark Office dated Jan. 30, 2020 in related U.S. Appl. No. 15/115,451, 10 pages.
International Preliminary Report on Patentability issued by the International Bureau of WIPO in related International Application No. PCT/GB2015/050236 dated Aug. 2, 2016, 7 pages.
International Search Report and Written Opinion issued by the International Searching Authority in related International Application No. PCT/GB2015/050236 dated Apr. 20, 2015, 10 pages.
Search Report issued by British Intellectual Property Office in related British Patent Application No. 1401597.8 dated Oct. 8, 2014, 5 pages.
Non-Final Office Action issued by the U.S. Patent and Trademark Office dated Dec. 7, 2018 in related U.S. Appl. No. 15/115,460, 9 pages.
Final Office Action issued by the U.S. Patent and Trademark Office dated Jun. 4, 2019 in related U.S. Appl. No. 15/115,460, 11 pages.
Search Report issued by British Intellectual Property Office in related British Patent Application No. 1401606.7 dated Jul. 24, 2014, 3 pages.
International Preliminary Report on Patentability issued by the International Bureau of WIPO in related International Application No. PCT/GB2018/051465 dated Dec. 3, 2019, 14 pages.
International Preliminary Report on Patentability issued by the International Bureau of WIPO in related International Application No. PCT/GB2018/052278 dated Feb. 18, 2020, 9 pages.
International Search Report and Written Opinion issued by the International Searching Authority in related International Application No. PCT/GB2018/052278 dated Apr. 10, 2019, 11 pages.
International Preliminary Report on Patentability issued by the International Bureau of WIPO in related International Application No. PCT/GB2018/052279 dated Feb. 18, 2020, 5 pages.
International Search Report and Written Opinion issued by the International Searching Authority in related International Application No. PCT/GB2018/052279 dated Nov. 9, 2018, 7 pages.
Search Report issued by British Intellectual Property Office in related Brittish Patent Application No. 1713098.0 dated Feb. 6, 2019, 2 pages.
Search Report issued by British Intellectual Property Office in related British Patent Application No. 1708639.8 dated Nov. 22, 2017, 5 pages.
Search Report issued by British Intellectual Property Office in related British Patent Application No. 1713096.4 dated Feb. 11, 2019, 2 pages.
Non-Final Office Action issued by the U.S. Patent and Trademark Office dated Oct. 1, 2015 in related U.S. Appl. No. 14/351,060, 8 pages.
Final Office Action issued by the U.S. Patent and Trademark Office dated Jul. 22, 2016 in related U.S. Appl. No. 14/351,060, 10 pages.
Final Office Action issued by the U.S. Patent and Trademark Office dated Jun. 8, 2017 in related U.S. Appl. No. 14/351,060, 11 pages.
Non-Final Office Action issued by the U.S. Patent and Trademark Office dated Mar. 21, 2018 in related U.S. Appl. No. 14/351,060, 13 pages.
Final Office Action issued by the U.S. Patent and Trademark Office dated Jan. 8, 2019 in related U.S. Appl. No. 14/351,060, 12 pages.
Non-Final Office Action issued by the U.S. Patent and Trademark Office dated Sep. 24, 2019 in related U.S. Appl. No. 14/351,060, 11 pages.
International Preliminary Report on Patentability issued by the International Bureau of WIPO dated Apr. 15, 2014 in related International Application No. PCT/GB2012/052503, 5 pages.
Non-Final Office Action issued by the U.S. Patent and Trademark Office in related U.S. Appl. No. 14/420,690 dated Jan. 4, 2021, 18 pages.
Non-Final Office Action issued by the U.S. Patent and Trademark Office in related U.S. Appl. No. 16/615,993 dated Jun. 23, 2021, 11 pages.
Non-Final Office Action issued by the U.S. Patent and Trademark Office in related U.S. Appl. No. 16/637,302 dated May 27, 2021, 7 pages.
Final Office Action issued by the U.S. Patent and Trademark Office in related U.S. Appl. No. 14/420,690 dated Sep. 15, 2021, 18 pages.

* cited by examiner

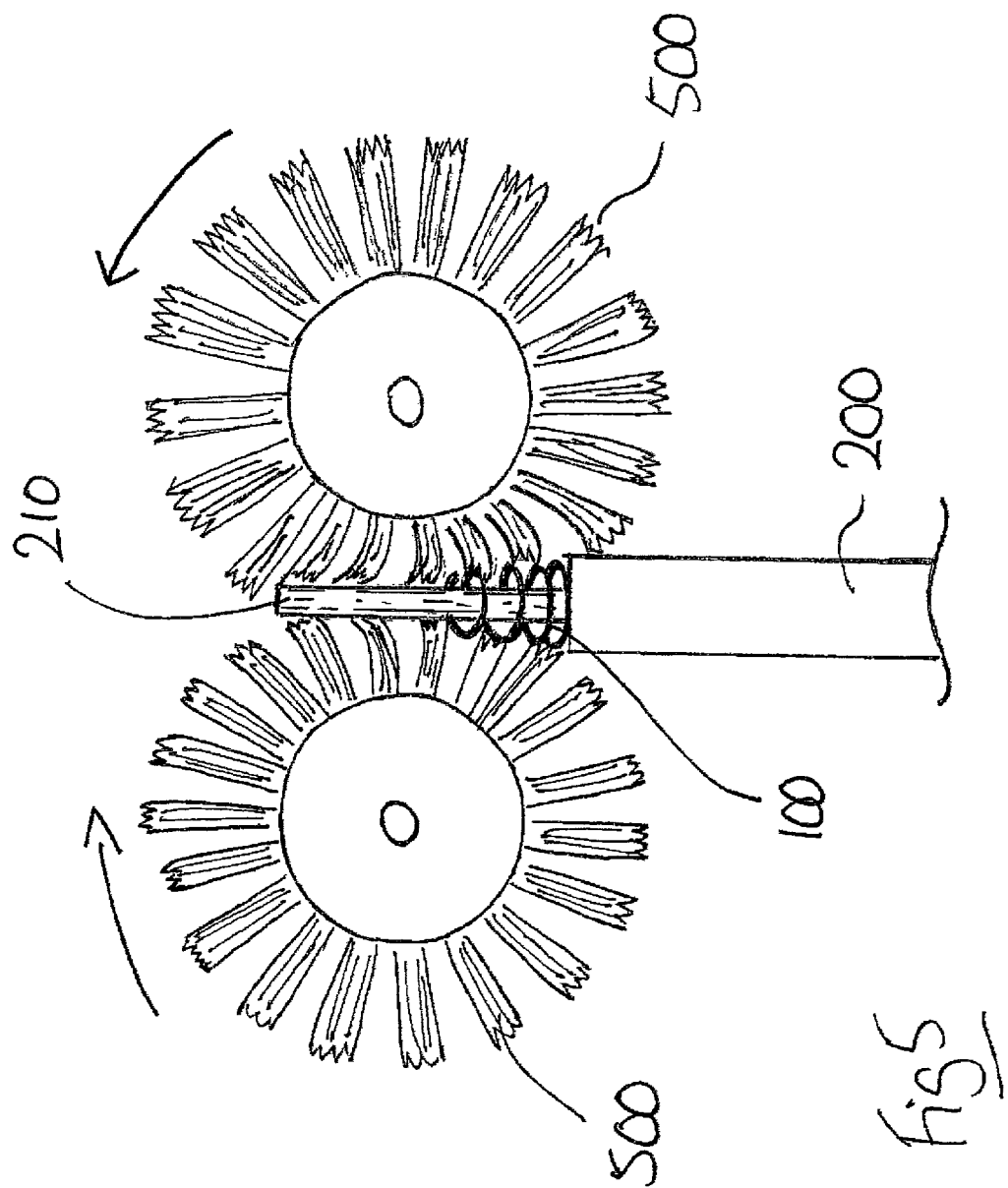

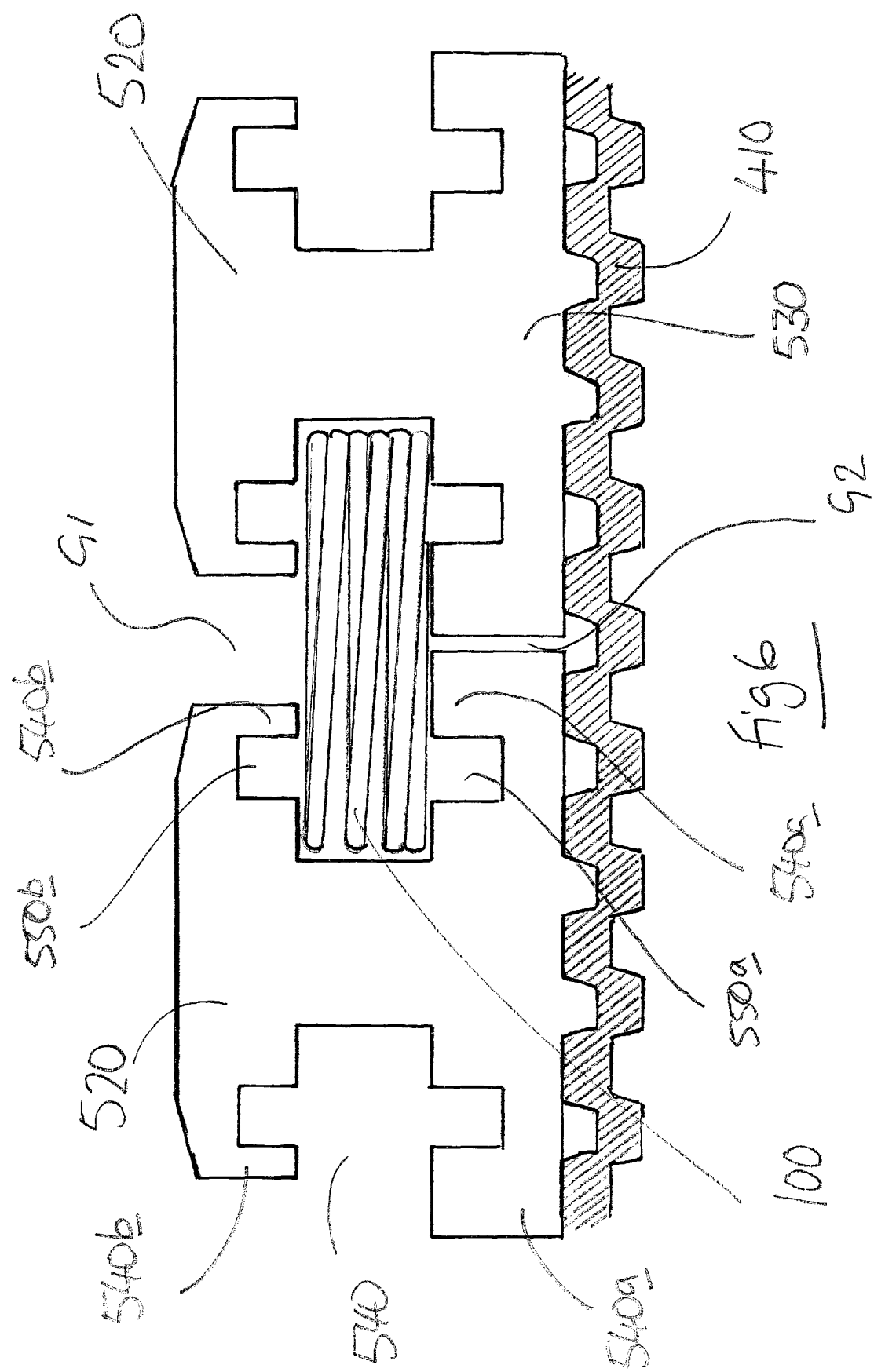

TRANSPORTATION APPARATUS AND METHOD

CROSS-REFERENCE TO RELATED APPLICATIONS

The present application is a U.S. National Stage filing under 35 U.S.C. 371(c) of International Application No. PCT/GB2018/051465, filed May 30, 2018; which claims priority to application no. GB 1708639.8 filed May 31, 2017, the disclosures of which are hereby incorporated by reference in their entireties.

The present invention relates to a transportation apparatus and method for transporting articles, and is concerned particularly, although not exclusively, with apparatus and a method for transporting springs.

In upholstered articles, such as mattresses, that use pocketed—or encapsulated—coil springs, the manufacturing process usually involves transporting springs of metal wire from a coiling station, where a wire is formed into the spring which is then cut from the length of wire, to a pocketing station, where the formed spring is encapsulated in a pocket formed from material.

One known method for doing this can be seen in European patent number EP 1 993 947 B, from the present inventors. In this method, springs are compressed and fed between opposed (upper and lower) conveyor belts which transport the springs to a pocketing station, where they are pushed out from between the belts to positions between axially spaced sheets of pocketing material. The sheets are then welded together at locations between the springs to form pockets around them.

In one previously considered example, springs are formed and cut from a length of wire before being deposited on radially extending, retractable arms of a wheel. The wheel then compresses the springs before depositing them between a castellated lower conveyor belt and a fixed, low-friction plate above. The belt drives the springs to the pocketing station as before, and the end of the spring not engaged by the belt slides against the plate as the belt moves.

The above methods of transporting the springs from the coiler to the pocketing station can encounter problems when the springs have a relatively long axial length or else a relatively high number of turns (ie coils). This is because longer springs and springs with greater numbers of turns may be less stable or may be of greater stiffness.

In the case of the moving belt and stationary plate above, an unstable spring may bend under the force of the belt. This can be because the force of the belt acting on a proximal end of the spring, in a direction transverse to its axis, may not be efficiently transmitted to other coils, so that coils at the distal end, in contact with the plate, are unable to overcome the friction force of the upper plate.

This can sometimes cause the spring to become dislodged from the transport apparatus, which is inconvenient and may lead to down-time for the apparatus.

Embodiments of the present invention aim to provide a conveyor and a method of conveying, in which the aforementioned problems are addressed.

The present invention is defined in the attached independent claims, to which reference should now be made. Further, preferred features may be found in the sub-claims appended thereto.

According to one aspect of the present invention, there is provided a conveyor for transporting articles, the conveyor comprising a substrate for supporting articles during transportation, and a plurality of retaining members located on the substrate for retaining the articles on the substrate during transportation.

The retaining members may be arranged in use to at least partly enclose the articles.

The retaining members may be arranged in use to hold the articles under compression on the conveyor.

In a preferred arrangement the or each retaining member comprises a mounting portion that engages the substrate.

The or each retaining member preferably also comprises at least one containment portion arranged in use to bear against at least a part of an article being supported on the conveyor.

In a preferred arrangement, the containment portion comprises a proximal part and a distal part. The proximal part of the containment portion may be arranged proximate to the substrate and the distal part may be arranged to be spaced therefrom. The proximal and distal parts of the containment may define a space therebetween for accommodating a part of an article, such as a spring, in use.

The retaining member may be arranged in use to retain an article between the proximal and distal parts of the containment portion.

The retaining member may comprise at least one slot, for receiving a displacement device, such as a mechanical pusher, arranged in use to displace the article from the substrate.

In a preferred arrangement, there is a plurality of retaining members that may be spaced apart on the substrate along its axis. At least parts of adjacent retaining members may be separated by a gap that is selected to accommodate depositing apparatus for depositing articles on the substrate. Preferably the distal parts of the containment portions of adjacent retaining members are arranged to be spaced by a first gap and preferably proximal parts of adjacent retaining members are arranged to be spaced by a second gap, or not to be spaced at all. The first gap is preferably greater than the second gap.

One or more of the retaining members may be attached to the substrate. Alternatively, or in addition, one or more of the retaining members may be substantially integrally formed with the substrate, for example by moulding.

The substrate may comprise an endless belt or a chain for example.

The conveyor may comprise transportation apparatus for coil springs.

In a preferred arrangement, at least one coil spring is arranged to be retained in a retaining member such that coils at opposed ends of the spring are axially offset with respect to one another. The spring is preferably arranged to be retained in a splayed configuration in which at least some adjacent coils are axially offset.

According to another aspect of the present invention there is provided a method of transporting articles, the method comprising retaining the articles on a conveyor comprising a substrate for supporting the articles and at least one retaining member on the substrate.

The method may comprise retaining at least one of the articles on the conveyor by locating it at least partly beneath or within a retaining member and preferably under compression.

The method may comprise retaining at least one of the articles on the conveyor by locating it between proximal and distal containment parts of a retaining member.

Preferably the method comprises retaining at least one of the articles on the conveyor using two adjacent retaining members that are preferably spaced on the substrate.

The method may comprise a method of transporting coil springs on a conveyor. In one arrangement, the method may comprise retaining at least one spring such that coils at opposed ends of the spring are axially offset with respect to one another.

The method may include retaining the spring in a splayed configuration, in which at least some adjacent coils are offset axially.

In accordance with another aspect of the present invention there is provided compression apparatus for use in at least partly compressing a spring axially mounted on a support rod, the apparatus comprising at least one rotating portion for locating beside the rod and arranged in use to press against a spring mounted on the rod in a generally axial direction of the spring.

In a preferred arrangement the apparatus comprises at least two rotating portions, one located either side of the rod, and preferably arranged to rotate in a mutually opposite sense.

The or each rotating portion may comprise a rotating brush.

The invention also comprises a method of compressing a spring mounted on a rod, the method comprising pressing against the spring using a rotating portion.

The method preferably comprises pressing against the spring using at least two rotating portions, one located either side of the rod.

The invention may include any combination of the features or limitations referred to herein, except such a combination of features as are mutually exclusive, or mutually inconsistent.

A preferred embodiment of the present invention will now be described, by way of example only, with reference to the accompanying diagrammatic drawings, in which:

FIG. 5 shows schematically a pre-compression apparatus for use with the conveyor of FIG. 4; and FIG. 6 shows schematically an alternative embodiment of spring transportation apparatus in accordance with the present invention.

Figure 1:
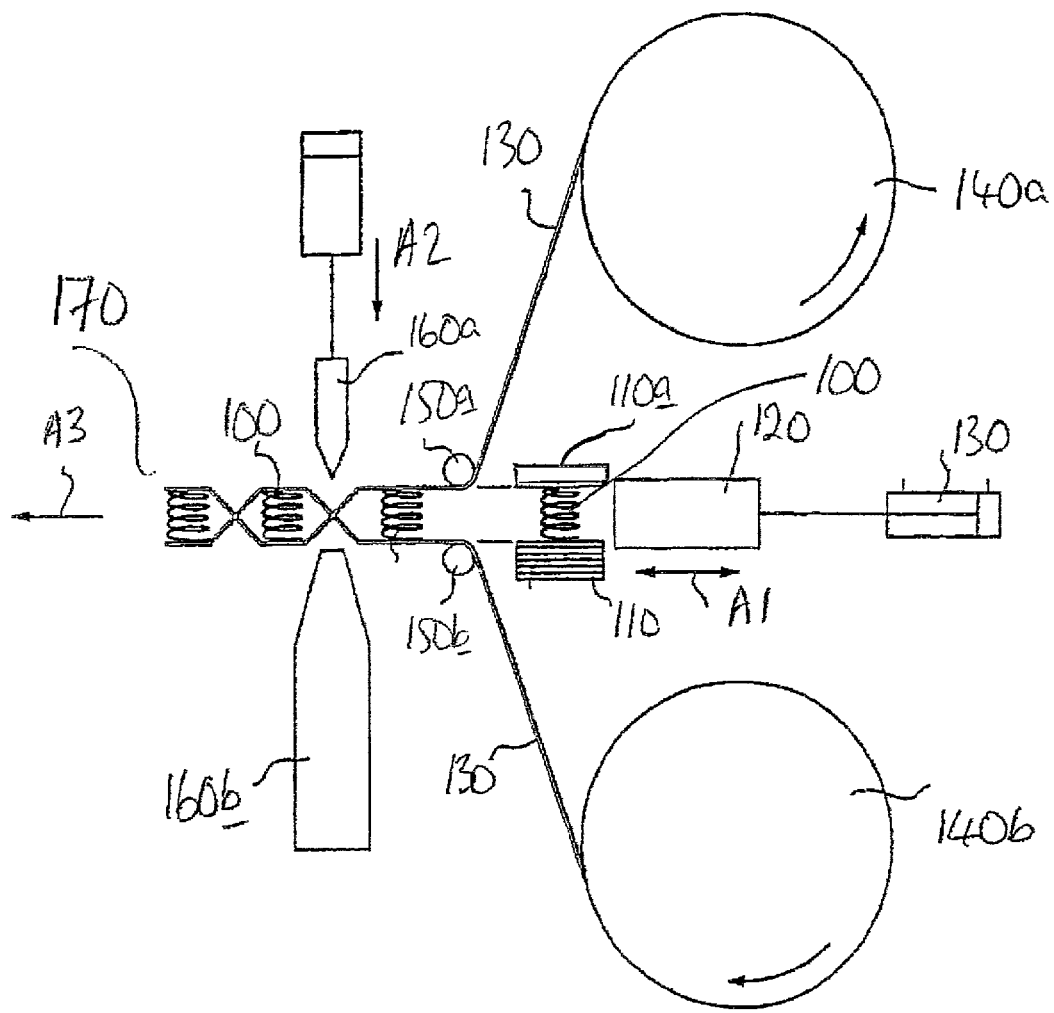
FIG. 1 shows schematically a previously considered apparatus for pocketing springs.

FIG. 1 shows schematically an example of apparatus described in the abovementioned patent, for making pocketed spring units for upholstered articles such as mattresses. Springs 100 are conveyed under compression to a spring-inserting position by an endless belt 110. The springs are trapped between the belt 110 and a low-friction plate 110a. Once at the pocketing station, the springs are pushed by mechanical pushers 120 that are driven by a motor 130 to move in a reciprocating motion, indicated by arrow A1.

The pushers 120 push the springs into positions between sheets of material 130 fed from upper and lower supply rollers 140a and 140b via guide rollers 150a and 150b.

The sheets 130 are joined at positions between springs by the reciprocating action of an upper welding tool 160a in the direction shown by arrow A2 that presses the sheets together and fuses them on a welding anvil 160b. A row of springs becomes encapsulated in pockets at each stepwise advancement of the resilient unit 170 in the direction of Arrow A3.

Figure 2:
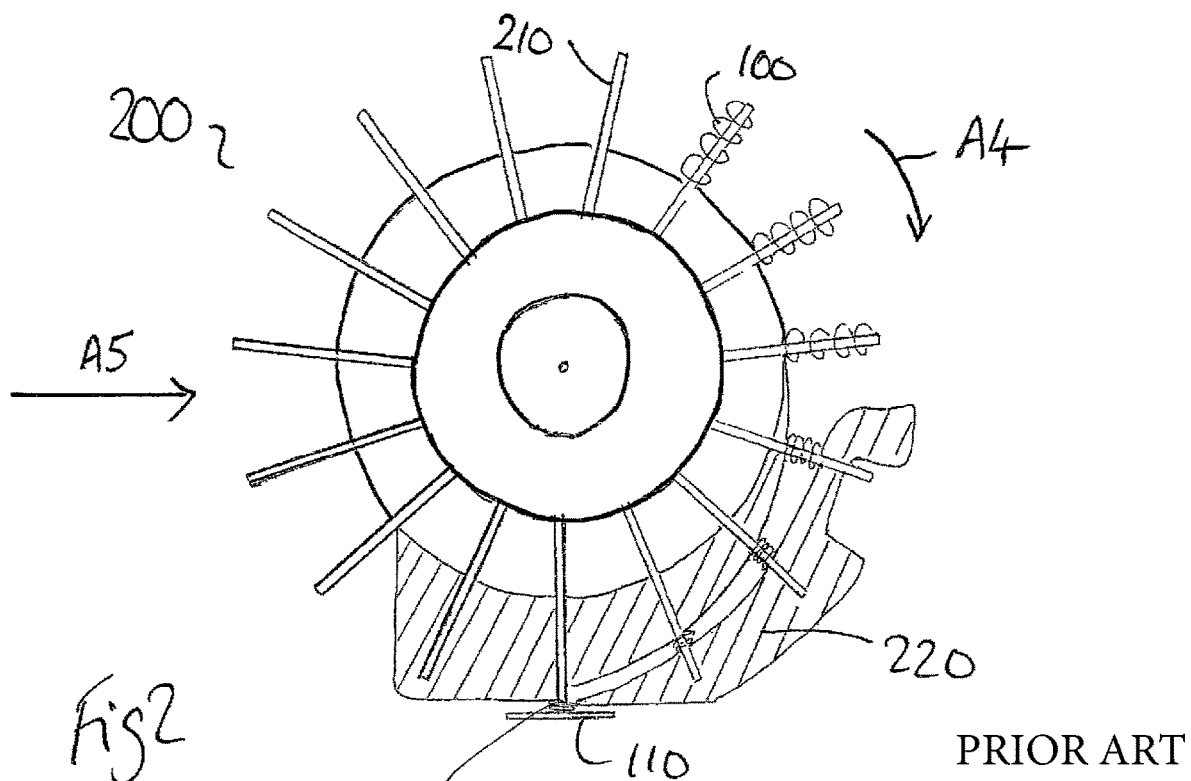
FIGS. 2 and 3 show part of a previously considered apparatus for depositing springs onto a conveyor.

FIG. 2 shows schematically a wheel apparatus 200 for depositing the springs onto the belt 110. The wheel has a plurality of spokes in the form of retractable rods 210. A coiling machine (not shown) loads a spring 100 onto each rod as the wheel turns in the direction of Arrow A4. The spokes then enter a compression zone 220, formed by two parallel tapering walls. The walls are spaced to allow the rod to pass between them but the springs are caught and gradually compressed as the rod progresses towards the bottom of the wheel.

Then, when the spring is maximally compressed it is deposited onto a castellated conveyor belt 110 which carries the spring away in a direction substantially parallel with the axis of rotation of the wheel.

Figure 3:
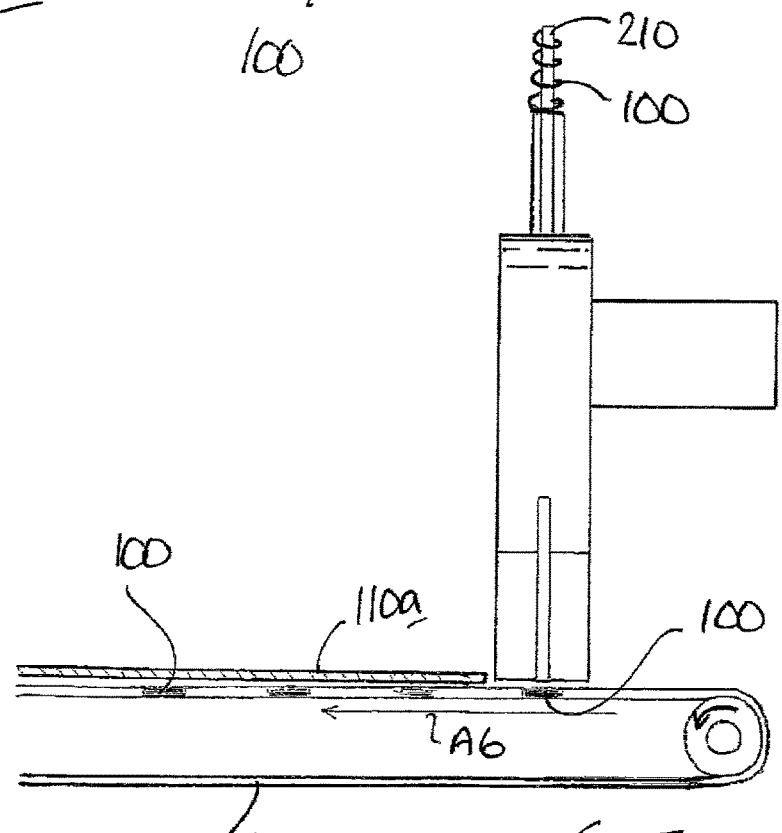

FIG. 3 shows schematically the wheel viewed from the direction of Arrow A5 of FIG. 2. The figure shows the springs 100 being conveyed between the belt 110 and a low-friction plate 110a in the direction of Arrow A6, towards a pocketing station (not shown), such as is shown in FIG. 1.

As previously mentioned, particularly when longer springs are used, or springs with more turns of wire, or else springs of relatively thin wire (smaller gauge), problems can arise during transportation. For example, if the spring is particularly stiff, the increased friction experienced as it slides along the plate 110a can sometimes cause the spring to bend or even to become dislodged as the belt moves. This can also happen when the spring is unstable, so that the force exerted by the belt is not fully transferred to the turns of wire located distally of the belt. Again the spring can bend and sometimes become dislodged.

As well as potentially causing a spring to be omitted from the pocketed unit, this also leads to costly down-time for the pocketing machine as the missing spring must be located.

Figure 4:
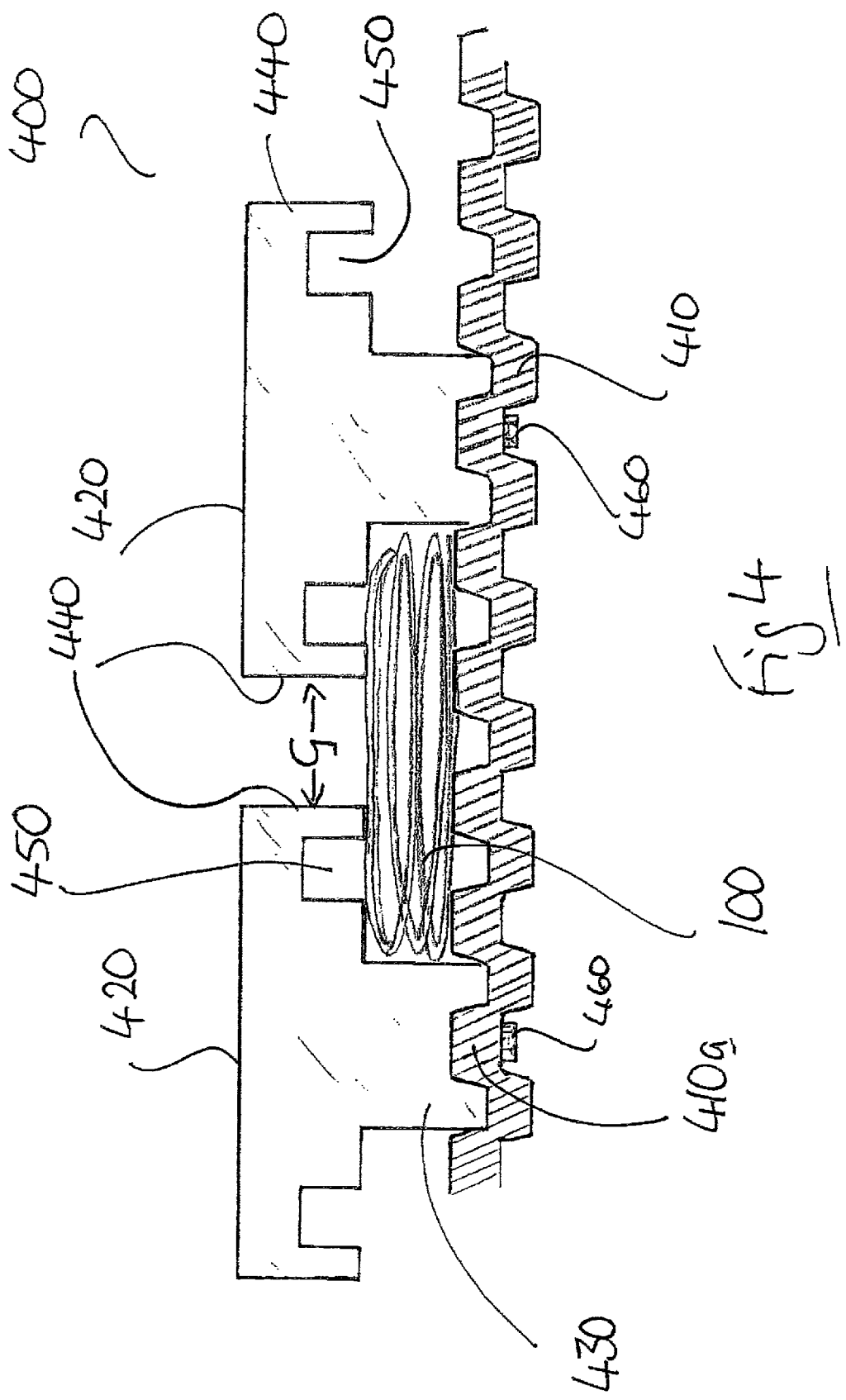
FIG. 4 shows schematically a conveyor transportation apparatus according to an embodiment of the present invention.

Turning to FIG. 4, this shows generally at 400, in schematic part-sectional view, a conveyor according to an embodiment of the present invention. The conveyor 400 is suitable for use as spring transportation in a pocketed spring apparatus such as is described above with reference to FIG. 1 and can replace the belt/plate assembly 110/110a.

The conveyor 400 comprises a substrate 410 (shown in cross section), in this case in the form of a castellated belt of nylon/plastics material, upon which are attached at equally spaced locations a plurality of retaining members 420 for securely retaining a number of springs 100 on the substrate.

The retaining members comprise substantially T-shaped bodies of nylon/plastics material, each having a mounting portion 430 at its base that is mounted on the substrate. In this example the mounting portion straddles a castellation 410a of the substrate.

The mounting portion extends away from the substrate and supports integrally formed, opposed containment portions 440 which extend substantially parallel to the substrate.

Adjacent retaining members are spaced on the substrate by a gap G, which is sufficient to allow a rod 210 of a spring depositing wheel 200 (see FIG. 2) to pass therebetween, so that the spring becomes held on the substrate between opposed containment portions of adjacent retaining members, whilst remaining compressed.

On each side of the retaining member, in a direction substantially parallel with the substrate, are located slots 450 for receiving pushers (e.g. 120 in FIG. 1) which travel transversely of the substrate to urge the spring from the substrate, at the point at which it is to be encapsulated in material. The height of the slot 450 is such as to provide space above the trapped spring. Meanwhile, the castellations of the substrate in this case provide space below the spring, such that a pusher that is taller than the height of the spring may be used.

This allows the pusher to extend above and below the compressed spring to discourage or prevent the spring from becoming trapped above or below the pusher. A pair of pushers is used to eject a single spring by engaging the spring at two places on its radial periphery, and by sliding into the slots 450.

In the example shown, the retaining members comprise discrete fixtures that are secured to the substrate from below by bolts 460. However, the retaining members could, as an alternative or in addition, be affixed to the substrate by another method, such as by adhesive. Indeed, the retaining members and the substrate could be formed integrally, such as by moulding.

FIG. 5 shows a pre-compression apparatus for use with the apparatus of FIGS. 1-4. The schematic view is from above, looking down on a rod 210 of the wheel 200 of FIG. 2. A pair of rotating brushes, 500, are located one either side of the rod 210. The brushes are rotating in an opposite sense so as to push a spring 100 located on the rod 210. As the brushes rotate they tend to compress the spring so that prior to the spring entering the compression zone 220 of the wheel (see FIG. 2) the spring is already partly compressed.

In use, the pre-compression apparatus 500 is deployed immediately prior to the rod entering the compression zone 220. This is useful, particularly with longer springs, to help accommodate them within the opening of the compression zone.

FIG. 6 shows schematically an alternative embodiment of conveyor, in which retaining members 520, of a different shape to those of the FIG. 4 embodiment, are mounted on the substrate 410.

In particular, the retaining members 520 each comprise a mounting portion 530 for mounting to the substrate 420. A containment portion 540 comprises proximal and distal parts 540*a* and 540*b* define a space therebetween for receiving a coil spring 100 under compression. Slots 550*a* and 550*b* in the containment parts are aligned for receiving pushers (e.g. 120 in FIG. 1) in a similar way as was described above in relation to the FIG. 4 embodiment. Again, the slots are of sufficient length to accommodate pushers that are taller than the height of the compressed spring.

Again, the retaining members 520 may be secured to the substrate by suitable fixtures, as with the FIG. 4 embodiment (though omitted from FIG. 5).

A first gap G1 between the distal containment parts 540*a* may be greater than a second gap G2 between the proximal containment parts 540*b* of adjacent retaining members. The first gap G1 is suitable for receiving a rod 210 of a spring depositing wheel 200 (FIG. 2). The second gap G2 can be smaller (as shown) or even substantially zero.

In this embodiment the spring is contained by an adjacent pair of retaining members alone and does not rest against the substrate. This provides a number of advantages:

Firstly, the compressed spring is no longer urging the retaining member and the substrate apart, which is useful for heavier gauge, or taller springs.

Secondly, as the substrate plays no part in the retention of the spring, a single substrate may be used with differently sized retaining members, or retaining members arranged with different spacing, to accommodate springs of different diameters. Also, insertion and removal of springs does not cause any wear on the substrate, only on the retaining members which can be easily replaced.

Furthermore, as the moving spring bears only against the proximal and distal containment parts of the blocks during insertion and removal, which parts are of a common material, there is no difference in the friction force experienced between the opposed ends of the spring, which could otherwise lead to an unintentional, or uncontrolled misalignment of the spring, and possibly a misfeed during pocketing.

In one embodiment (not shown) at least some of the springs are held in the retaining members in a splayed configuration, such that adjacent coils are at least partly axially offset, rather than aligned in a cylindrical shape. In this configuration, when the spring is displaced from the retaining members it will automatically seek to re-orientate itself so that its longitudinal axis is transverse, more preferably substantially 90 degrees, to that which it was when it was held by the retaining member. This is useful in applications where it would otherwise be necessary to "turn" the spring in the pocket, to achieve the desired pocketing configuration.

To achieve the splayed configuration one end of the spring may be at least partly or temporarily restrained or slowed with respect to the other as the spring is being inserted into the retaining member.

Whilst the example described above is concerned with the transportation of springs, it will be understood by those skilled in the art that such transportation apparatus and method may be used to transport other articles.

Whilst endeavouring in the foregoing specification to draw attention to those features of the invention believed to be of particular importance, it should be understood that the applicant claims protection in respect of any patentable feature or combination of features referred to herein, and/or shown in the drawings, whether or not particular emphasis has been placed thereon.

The invention claimed is:

1. A conveyor for transporting coil springs, the conveyor comprising a substrate for supporting springs during transportation, and a plurality of retaining members located on the substrate for retaining the springs on the substrate during transportation, wherein the retaining members each comprise a mounting portion for mounting to the substrate and a containment portion having proximal and distal parts defining a space therebetween for receiving at least a part of a spring under compression, and the retaining members are arranged such that each spring is held by a pair of adjacent retaining members.

2. A conveyor according to claim 1, wherein the retaining members are arranged in use to at least partly enclose the springs as they rest on the substrate.

3. A conveyor according to claim 1, wherein the retaining member comprises at least one slot, for receiving a displacement device, such as a mechanical pusher, arranged in use to displace the spring from the substrate.

4. A conveyor according to claim 1, wherein there is a plurality of retaining members spaced apart on the substrate along its axis.

5. A conveyor according to claim 4, wherein at least parts of adjacent retaining members are separated by a gap that is selected to accommodate depositing apparatus for depositing springs on the substrate.

6. A conveyor according to claim 1, wherein one or more of the retaining members is attached to the substrate.

7. A conveyor according to claim 1, wherein one or more of the retaining members is substantially integrally formed with the substrate, for example by moulding.

8. A conveyor according to claim 1, wherein the substrate comprises an endless belt or a chain.

9. A conveyor according to claim 1, wherein at least one coil spring is arranged to be retained in a retaining member such that coils at opposed ends of the spring are axially offset.

10. A method of transporting coil springs, the method comprising retaining the springs on a conveyor comprising a substrate for supporting the springs and a plurality of retaining members on the substrate, each retaining member comprising a mounting portion for mounting to the substrate and a containment portion having proximal and distal parts defining a space therebetween for receiving at least a part of a spring under compression, and the method includes retaining each spring by a pair of adjacent retaining members.

* * * * *